United States Patent [19]
Brinzei et al.

[11] 3,804,387
[45] Apr. 16, 1974

[54] TRAY WITH SELF-GUIDING TARGET VALVES FOR GAS-LIQUID AND VAPOR-LIQUID CONTACTING

[75] Inventors: Adrian Brinzei; Mihai Mezincescu, both of Ploiesti, Romania

[73] Assignee: Institutul de Cercetare si Proiectare Tehnologica Pentru Prelucrarea Titeiului, Ploiesti, Romania

[22] Filed: Feb. 25, 1972

[21] Appl. No.: 229,470

[52] U.S. Cl. .................. 261/79 A, 261/114 V, 260 T
[51] Int. Cl. ............................................... B01f 3/04
[58] Field of Search .................. 261/114 V, T, 79 A

[56] References Cited
UNITED STATES PATENTS

| | | | |
|---|---|---|---|
| 2,979,316 | 4/1961 | Houston, Jr. | 261/114 VT |
| 3,325,155 | 6/1967 | Bahout | 261/114 VT |
| 3,333,836 | 8/1967 | Bahout | 261/114 VT |
| 3,427,007 | 2/1969 | Braun | 261/114 VT |

FOREIGN PATENTS OR APPLICATIONS

| | | | |
|---|---|---|---|
| 42-13688 | 8/1967 | Japan | 261/114 VT |
| 48,918 | 10/1967 | Romania | 261/114 VT |

Primary Examiner—Tim R. Miles
Attorney, Agent, or Firm—Karl F. Ross

[57] ABSTRACT

A tray for a liquid-gas contactor comprising a plurality of openings formed with downwardly and inwardly converging aprons and respective downwardly converging valves received within the aprons and formed with gas-guiding slits. The valves are movable vertically within the distance determined by the engagement of a lift of the valve with the apron and radially extending members at the upper end of the vertical motion.

6 Claims, 24 Drawing Figures

FIG. 4
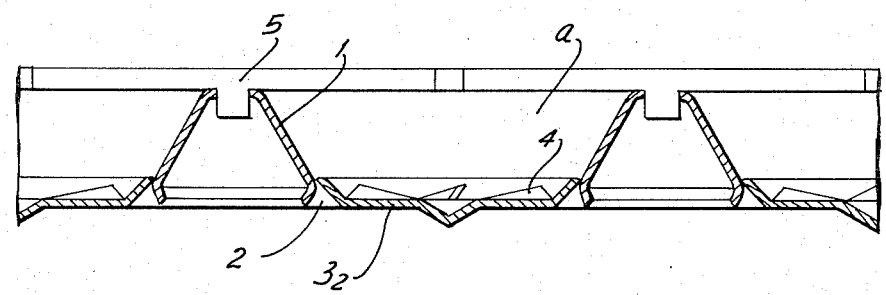
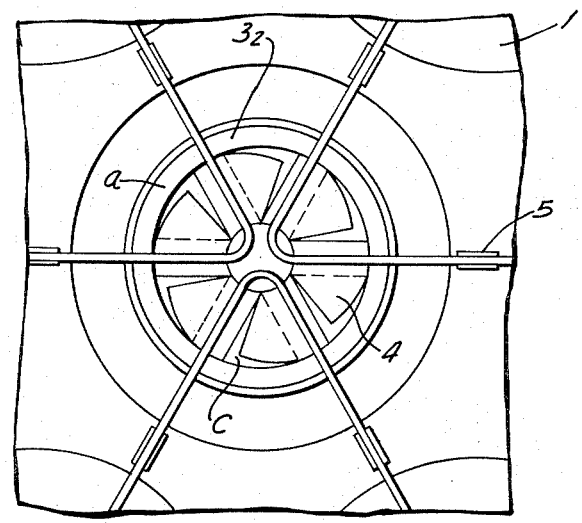
FIG. 5

FIG.7
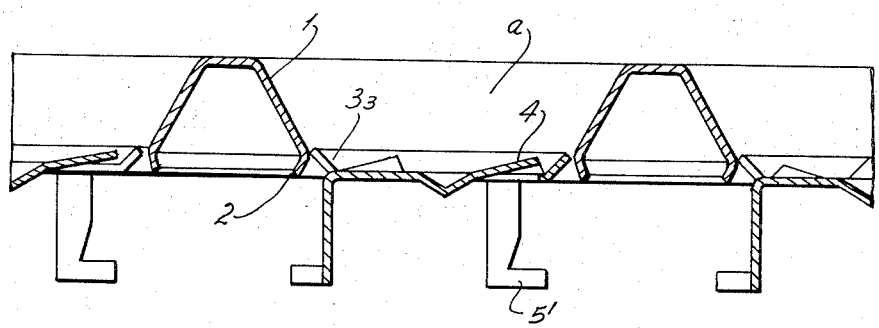
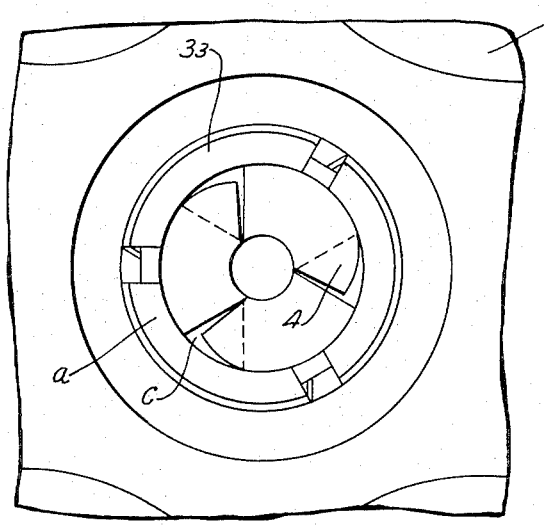
FIG.8

FIG. 13
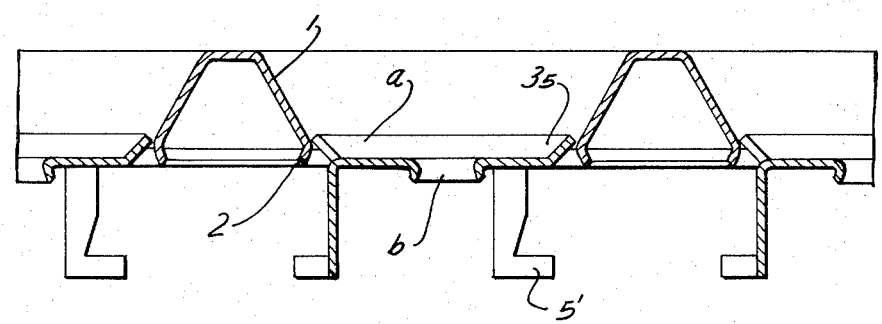
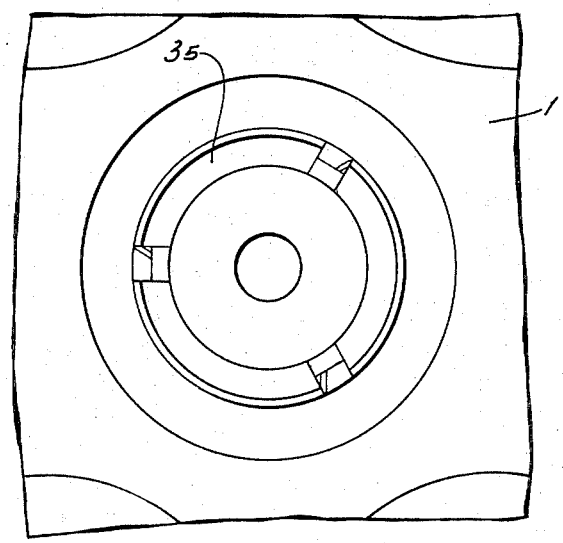
FIG. 14

FIG. 16
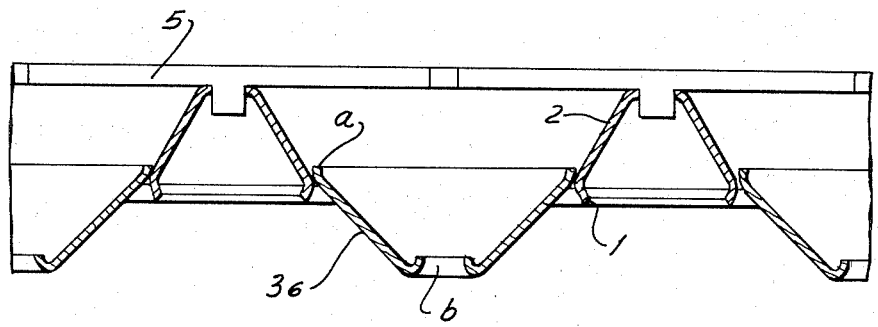
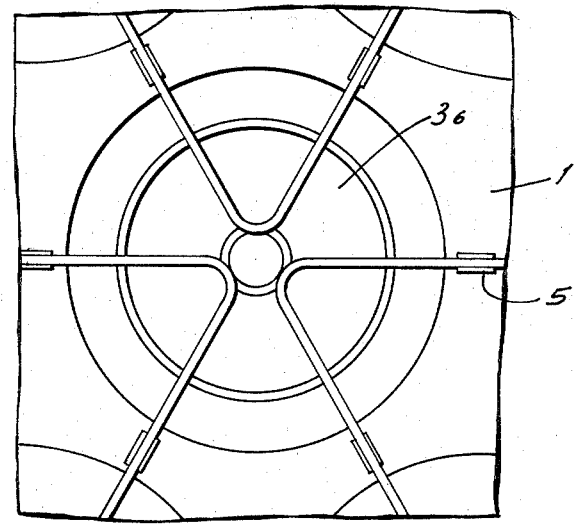
FIG. 17

FIG. 19
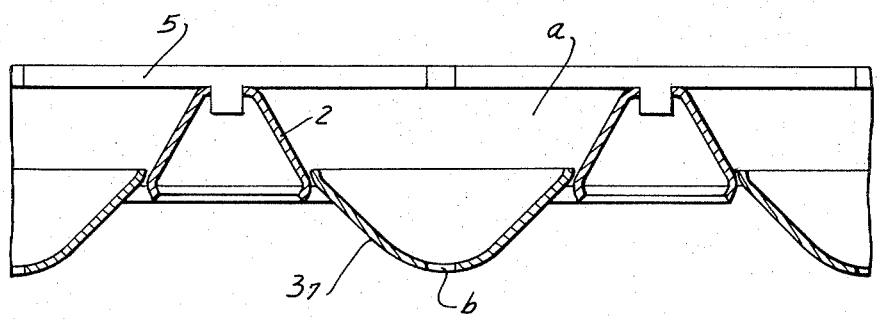
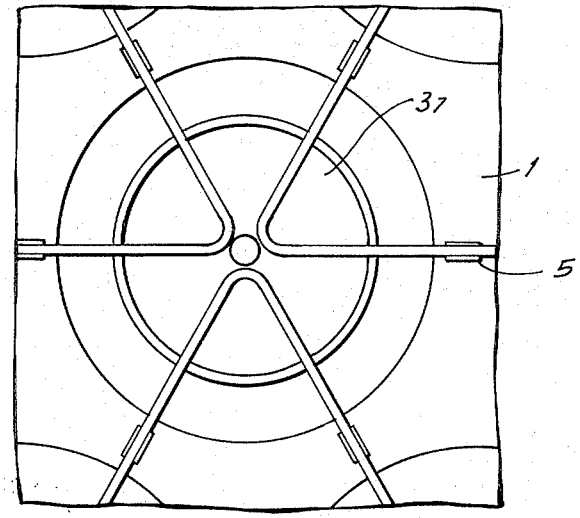
FIG. 20

3,804,387

TRAY WITH SELF-GUIDING TARGET VALVES FOR GAS-LIQUID AND VAPOR-LIQUID CONTACTING

FIELD OF THE INVENTION

This invention relates to trays with self-guiding target valves for gas-liquid and vapor-liquid contacting, to maintain a liquid level on the trays in the contacting columns and to establish, by means of target valves, the openings for the passage of gas and vapor stream, which is dispersed in the liquid.

BACKGROUND OF THE INVENTION

Contacting trays are known having valves with upward movement or rotary-upward movement, both types of valves being provided for mounting above the trays. The valved trays mentioned above have the following disadvantages: low interfacial surface area because of surfaces not fully used above the valves and relatively large surfaces between the valves, high dynamic pressure drop and low contacting time for the two phases.

SUMMARY OF THE INVENTION

The contacting trays of the invention, do not have the above-mentioned disadvantages since they are fabricated from a profiled plate provided with a weir and holes vertically limited by fixed parts set under the tray plane with convergent-tapered section towards the lower tray with lower edge sealed towards the exterior; a self-guiding target valve is disposed in each orifice, the lateral surface having the shape of a truncated cone, whose long base being towards the upper tray, is continued under its lower circumference, in the shape of a spherical convex cap towards the lower tray and provided with a central orifice. The target valve is provided on the lateral surface of the truncated cone with slots as well as blades sloped towards the interior of the truncated cone. Limiters, radially set above the orifices, are mounted on the profiled plate to limit the upper position of the target valve.

The self-guiding target valves located inside the orifices can have the shape of a truncated cone without the long base, while on the short base, pointed toward the lower tray, and with central part in the form of a cone with the point turned downward, are provided radial slots and blades inclined towards the upper tray; limiters radially set above the orifices, or limiters set under the target valve circumference are provided to limit the upper part of the target valves.

The self-guiding target valves located inside the orifices can also have the shape of the lateral surface of a truncated cone with the large base towards the upper tray and upper circumference sealed towards the center, the lower circumference limiting a divergent-tapered orifice towards the lower tray, limiters set radially above the orifices on the profiled plate are provided to limit the upper position of the target valve. Alternatively the valves have the shape of a disc with the edge inclined towards the upper tray and with a central orifice whose edge is continued divergent-tapered under the disc plane towards the lower tray; the circumference of the disc is provided with limiters set perpendicularly under its surface in order to limit the upper position of the target valves.

The self-guiding target valves located inside the orifices either may, in another embodiment have the shape of the lateral surface of a truncated cone with the long base towards the upper tray and upper and lower circumferences sealed towards the center, or have the shape of a lateral surface of a truncated cone with the long base towards the upper tray and upper circumference sealed towards the center, and under its lower circumference being continued in the shape of a spherical convex cap towards the tower tray and provided with a central orifice, limiters set radially above the orifices on the profiled plate being provided to limit the upper position of the target valve; the shape of the target valve may be that of a lateral surface of a truncated cone with the long base towards the lower tray and its lower circumference sealed towards the center, while the short base of the target valve is pointed towards the upper tray and is a central orifice; in this case, limitation of the upper position of the target valve is achieved by some limiters set on the lower circumference of the target valve, perpendicular on the tray surface.

DESCRIPTION OF THE DRAWING

FIG. 4 is a tray section in a vertical plane according to the invention, in another variant;

FIG. 5 is a top view of a tray according to FIG. 4;

FIG. 7 is a tray section in vertical plane according to the invention, in another variant;

FIG. 8 is a top view of a tray according to FIG. 7;

FIG. 13 is a tray section in a vertical plane, according to the invention, in another variant;

FIG. 14 is a top view of a tray according to FIG. 13;

FIG. 16 is a tray section in a vertical plane, according to the invention;

FIG. 17 is a top view of a tray according to FIG. 16;

FIG. 19 is a tray section in a vertical plane according to the invention in another variant;

FIG. 20 is a top view of a tray according to FIG. 19;

Figure 1:
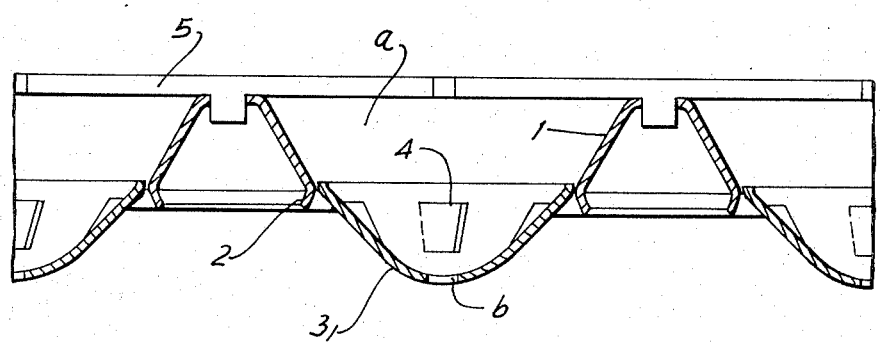
FIG. 1 is a tray section in a vertical plane, according to the invention.
Figure 2:
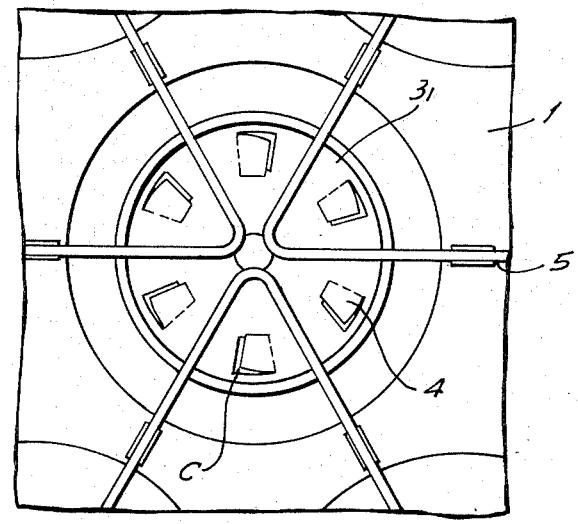
FIG. 2 is a top view of a tray, according to FIG. 1.
Figure 3:
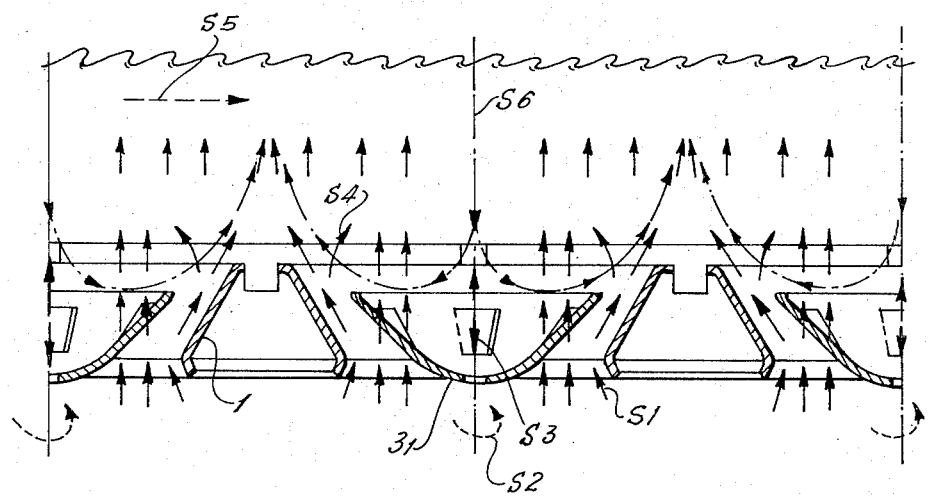
FIG. 3 is a tray section in vertical plane, according to FIG. 1, during operation, indicating gas and liquid streams.
Figure 6:
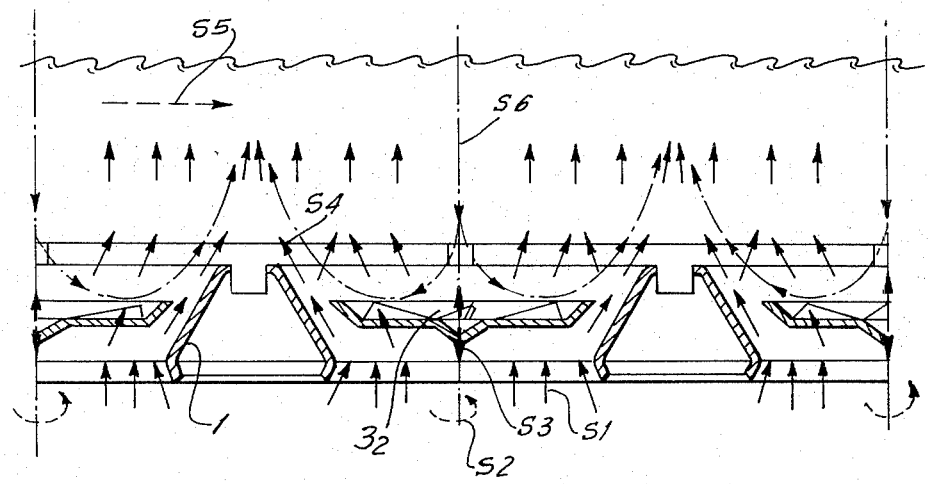
FIG. 6 is a tray section in vertical plane according to FIG. 4, during operation, indicating gas and liquid streams.
Figure 9:
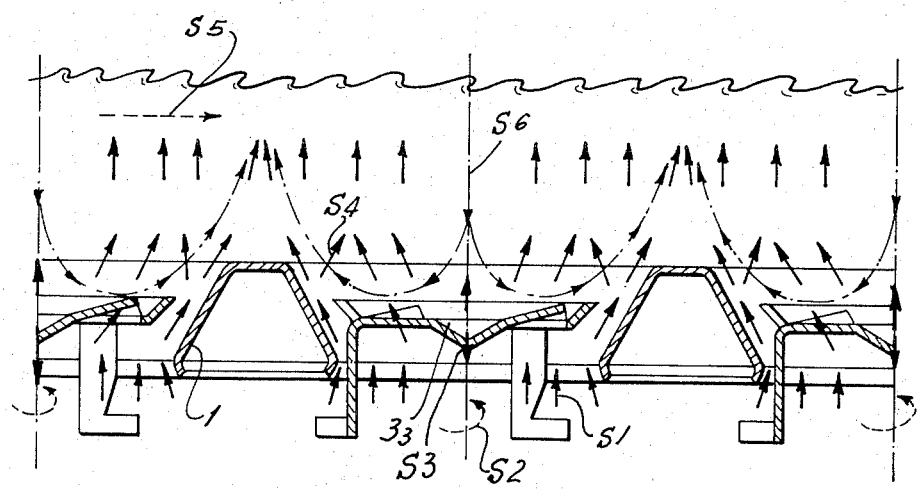
FIG. 9 is a tray section in vertical plane according to FIG. 7 during operation, indicating gas and liquid streams.
Figure 12:
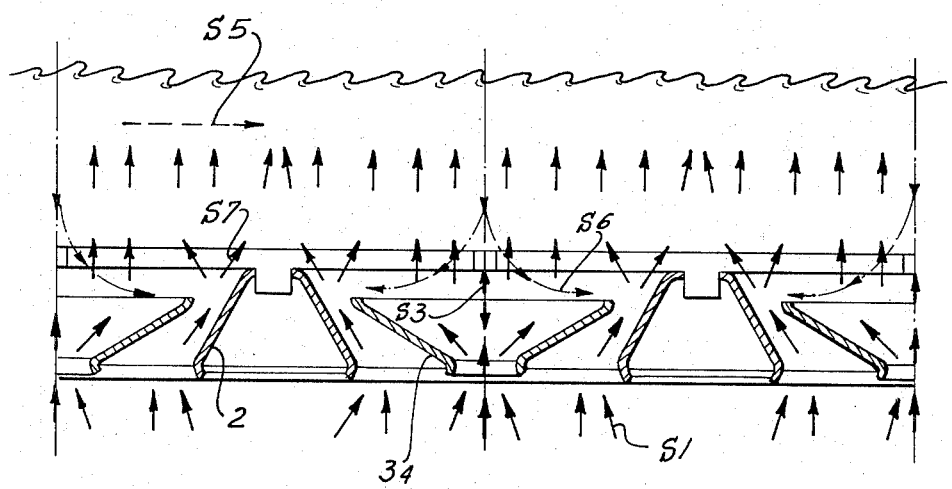
FIG. 12 is a tray section in a vertical plane according to FIG. 10, during operation, indicating gas and liquid streams.
Figure 10:
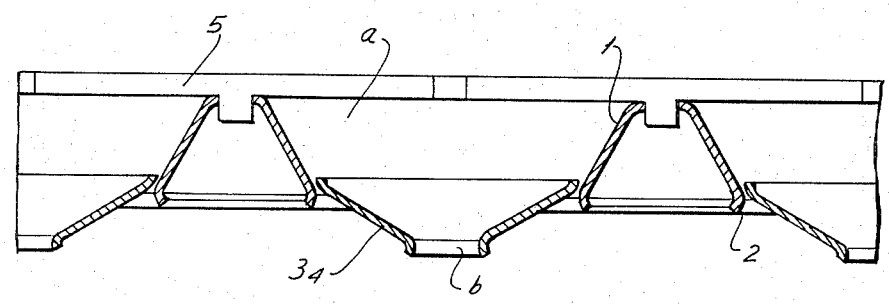
FIG. 10 is a tray section in a vertical plane according to the invention.
Figure 11:
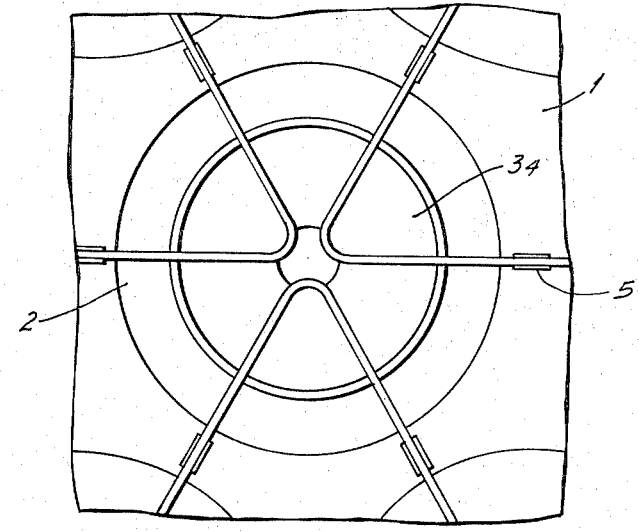
FIG. 11 is a top view of a tray according to FIG. 10.
Figure 15:
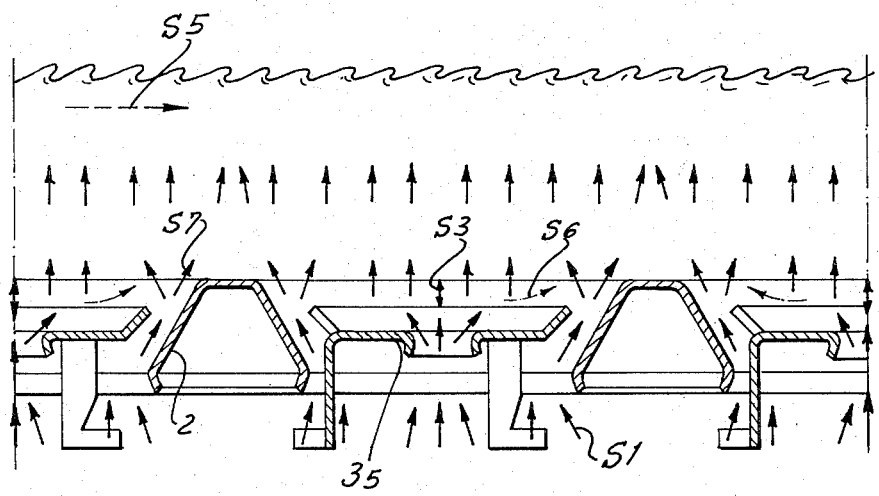
FIG. 15 is a tray section in a vertical plane according to FIG. 13, during operation, indicating gas and liquid streams.
Figure 18:
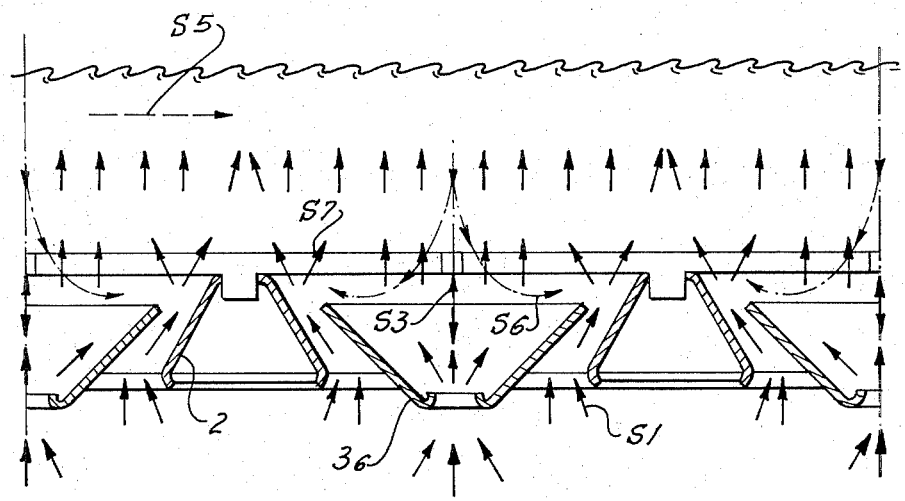
FIG. 18 is a tray section in a vertical plane, according to FIG. 16, during operation, indicating gas and liquid streams.
Figure 21:
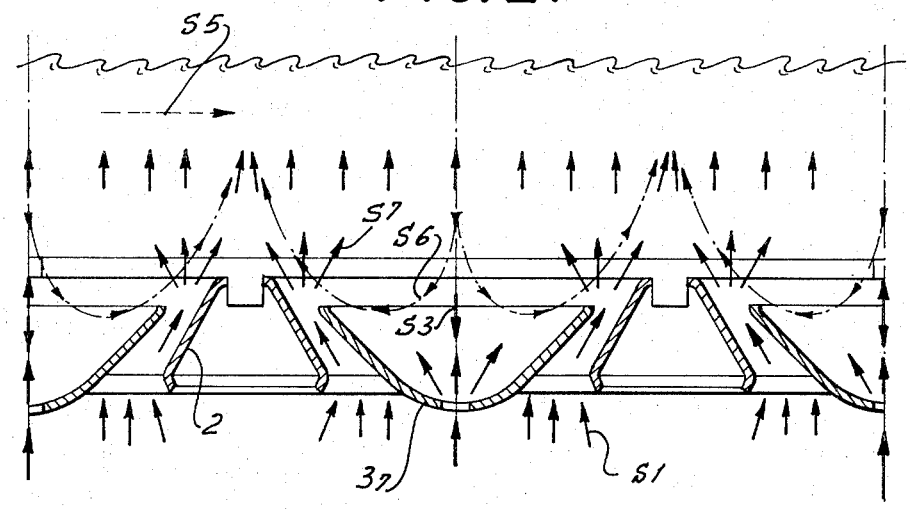
FIG. 21 is a tray section in a vertical plane, according to FIG. 19, during operation, indicating gas and liquid streams.
Figure 24:
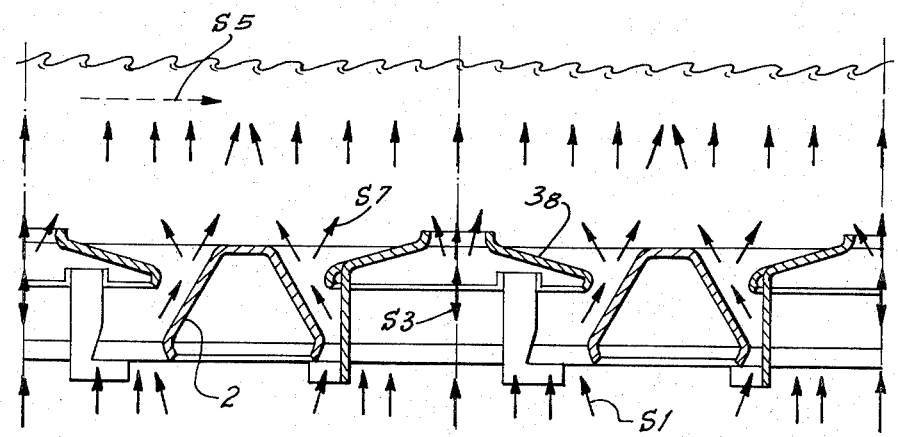
FIG. 24 is a tray section in vertical plane according to FIG. 22, during operation, indicating gas and liquid streams.
Figure 22:
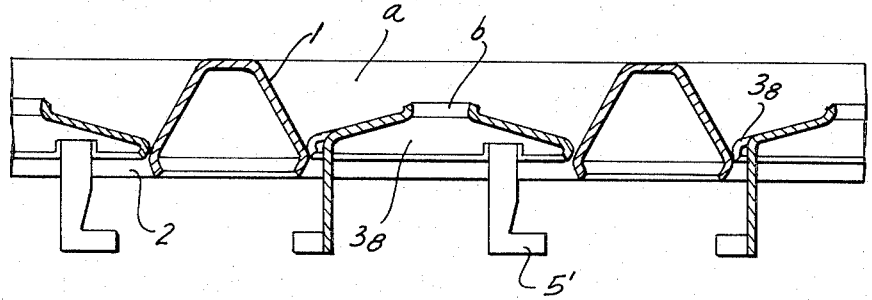
FIG. 22 is a tray section in a vertical plane according to the invention, in another constructive variant.
Figure 23:
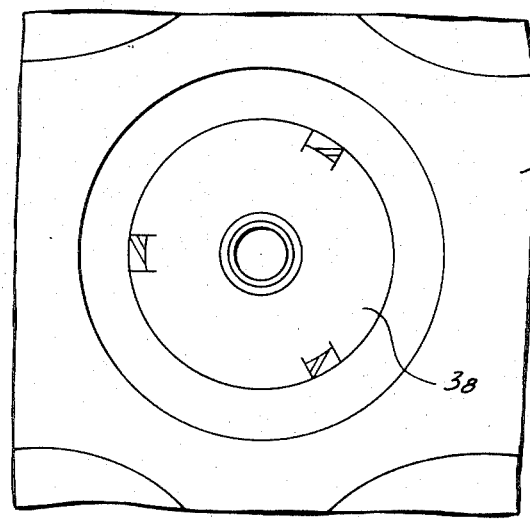
FIG. 23 is a top view of a tray according to FIG. 22.

1. A tray according to the invention, is made up of a profiled plate 1, provided with a weir, not shown and with orifices $a$ vertically limited by some fixed parts 2 set under the tray plane, having the convergent-tapered section towards the lower tray with lower edge sealed towards the exterior.

In each orifice $a$, which forms the interior of a fixed part 2, is located a self-guiding target valve 31, the lateral surface having the shape of a truncated cone whose long base being towards the upper tray is continued under its lower circumference in the shape of a spherical convex cap towards the lower tray and provided with a central orifice $b$.

Each self-guiding target valve 31 is provided with several slots $c$ on the lateral surface of the truncated cone as well as with blades 4 inclined towards the interior of the truncated cone by bending on execution of slots $c$ of the respective portion of target valve $3_1$ material.

Also, in order to limit the upper position of target valve $3_1$ during operation, limiters 5 are mounted on the tray, radially set above orifices $a$.

Due to the ascendent current of gas and vapors represented by arrow S1, target valves 3 have a rotary self-guided movement around the axis, represented by arrow S2 and an upward movement represented by arrow S3, due to the difference between dynamic pressure and gravitation force to which is also added a lifting force due to the shape of target valve $3_1$ blades 4, during their rotating movement.

At orifice $a$ outlet the gas and vapors have an ascending rotary movement as per arrow S4, while the liquid above target valves $3_1$, in its passage towards the weir as per arrow S5, has, due to rotation of target valves $3_1$ and difference of specific gravity, a movement from the center towards the rim as is shown by arrow S6.

2. A contacting tray according to the invention, in another constructive variant, is made up of a profiled plate 1, the same as that shown in example 1, the difference being that in orifices $a$ are located target valves $3_2$ having the shape of a truncated cone surface, with a long base, the short base being pointed towards the lower tray and the middle part having the form of a cone with the point towards, provided with radial slots $c$ and blades 4 slanted towards the upper tray resulting through bending of target valves $3_2$ on execution of slots $c$.

3. Another constructive type of tray according to the invention is identical with the tray described in example 2, the difference being that instead of limiters 5 mounted on the tray to limit the top position of target valves $3_2$ during operation, each target valve $3_3$ is provided with several limiters 5' placed under the circumference of target valve $3_3$.

4. A tray according to the invention of another constructive variant is made up of a profiled plate 1, provided with a weir, not shown, and with orifice $a$ vertically limited by some fixed parts 2 placed under the tray plane, having the convergent-tapered section towards the lower tray and lower edge sealed towards the exterior.

In each orifice $a$ which forms the interior of a fixed part 2, is located a self-guided target valve $3_4$ having the shape of a truncated cone's lateral surface with the long base being towards the upper tray and sealed towards the interior, the lower circumference being continued divergent-tapered towards the lower tray thus continuing an orifice $b$.

On profiled plate 1 are mounted some limiters 5 set radially above orifices $a$ to limit the upper position of target valves $3_4$ during operation.

Due to the ascendent current of gas and vapors represented by arrow S1, target valves $3_4$ are entrained in the self-guided ascendent movement, according to arrow S3 due to difference between dynamic pressure and gravitation force.

At orifice $a$ outlet the gas and vapors acquire an ascending movement, as per arrow S7, while the liquid above target valves $3_4$, on its way to the weir, as per arrow S5 acquires, due tp dynamic pressure difference at the upper level of target gate $3_4$, a movement from the center towards the edge, as per arrow S6 also entraining in this movement the gases that come out through the central orifices $b$ of target valves $3_4$.

5. In another constructive variant, the trays according to the invention are the same as those described in example 4, the difference being that in orifices $a$ are located target valves $3_5$ whose constructive form is that of a disc with the edge inclined towards the upper tray with a central orifice $b$ whose edge is continued divergent-tapered under the disc plane towards the lower tray.

In this type of tray, also according to the invention, instead of limiters 5 mounted on the tray to limit the upper position of target valves $3_4$ during operation, each target valve $3_5$ is provided with several limiters 5' placed under the circumference of the disc perpendicular on its surface.

6. A tray according to another constructive variant is made up of a profiled plate 1 provided with a weir and with orifices $a$ vertically limited on some fixed parts 2 placed under the tray plane, with the convergent-tapered section being towards the lower tray and lower edge sealed towards the exterior.

In each orifice $a$ which forms the interior of a fixed part 2, is located a self-guiding target valve $3_6$ having the shape of a truncated cone's lateral surface with the long base towards the upper tray and upper and lower circumference sealed towards the center. The short base of the truncated cone is a central orifice $b$ of target valve $3_6$.

Also, on profiled plate 1 are mounted limiters 5 placed radially above orifices $a$ to limit the upper position of target valves $3_6$ during operation.

Due to the ascendent current of gas and vapors, represented by arrow S1, target valves $3_6$ acquire a self-guided upward movement, as per arrow S3, under the action of dynamic pressure difference and gravitational force.

At orifice $a$ outlet the gas and vapors acquire an upward movement, as per arrow S7, while the liquid have target valves $3_5$, in its passage towards the weir as per arrow S5 acquires, due to dynamic pressure difference at the upper level of target valves $3_6$, a movement from center towards the edge, as per arrow S6, entraining also in this movement the gas that come out through the central orifices $b$ of target valves $3_6$.

7. In another constructive variant, the trays, according to the invention, are the same as those described in example 6, the difference being that in orifices $a$ are located self-guiding target valves $3_7$ having the shape of a truncated cone lateral surface with the long base towards the upper tray and upper circumference sealed towards the center, while under its lower circumference being continued under the form of a spherical convex cap towards the lower tray and provided with a central orifice $b$. Upper position of target valves $3_7$ is limited by limiters 5 the same as limiters 5 used under example 6.

8. Tray construction according to this example is identical to construction of trays in examples 6 and 7, the difference being that in orifices $a$ are located self-guiding target valves $3_8$, the shape of a truncated cone lateral surface with the long base towards the lower tray and its lower circumference sealed towards the center. The short base of target valve $3_8$ is pointed towards the top tray and is a central orifice $b$.

In this type of tray, also according to the invention, instead of limiters 5, mounted on the tray to limit the upper position of target valves $3_8$ during operation, each target valve $3_8$ is provided with several limiters $5'$ set on the lower circumference of target valves $3_8$ perpendicular on the tray plane.

The contacting trays, according to the invention, have the following advantages:

an interfacial gas-liquid surface and vapor-liquid is obtained superior to the other types of valve trays, due to the uniform distribution of the gas and vapor stream in the liquid mass;

substantially reduces the contacting zones not completely used, existing at the other known types of trays;

due to the constructive shape, they have a very low pressure drop as compared to other types of trays where the gas and vapors change their flowing direction;

there is a better contacting time between the two phases due to recirculation of liquid above the target valve;

significant material economies are achieved by replacing the flat plate of the known types of trays with a profiled plate of much smaller thickness;

there is no mechanical friction during operation, the target valve operating as a pneumatic bearing;

has a higher flexibility than all other types of trays due to the fact that during operation the target valves can take any stable intermediate position between the closed and open positions.

We claim:

1. A liquid/gas contactor comprising a tray formed with a multiplicity of downwardly converging frustoconical apron members defining gas passages upwardly through the tray and weirs around said passages upstanding from an upper surface of the tray; respective self-guided valve members vertically displaceable in said passages and having downwardly converging frustoconical portions engageable with the respective apron members at bottom ends thereof, said valve members being formed with throughgoing openings permitting gas to pass upwardly through said valve members, said valve members being vertically shiftable in the respective apron member to provide a clearance between each valve member and the surrounding apron member; and respective radially extending limiters on one member of each pair of said apron and valve members for restricting upward vertical movement of said valve members.

2. The liquid/gas contactor defined in claim 1 wherein each of said valve members is formed with a plurality of slots constituting the respective openings and with upwardly inclined vanes projecting from an upper surface of the valve member along edges of said slots.

3. The liquid/gas contactor defined in claim 1 wherein said valve members each have generally spherical convex cap portions connected to the respective frustoconical portions.

4. The liquid-gas contactor defined in claim 1 wherein said valve members have disk portions formed with said openings and surrounded by said downwardly converging frustoconical portions, said disk portions lying generally in planes perpendicular to the respective passage axis.

5. The liquid-gas contactor defined in claim 1 wherein said radially extending limiters of each apron member rests thereupon and project across the respective passage at the other end thereof for engagement with the respective frustoconical portion of the valve member received within the passage.

6. The liquid-gas contactor defined in claim 1 wherein said radially extending limiters include legs formed on each of said valve members in angularly spaced relation and outwardly turned radial portions at the lower end of each leg, said radial portions engaging the lower end of each passage upon vertical displacement of the valve member received in the passage.

* * * * *